United States Patent
Giebel et al.

(10) Patent No.: US 8,733,659 B2
(45) Date of Patent: May 27, 2014

(54) ARRANGEMENT FOR AND METHOD OF REGULATING LASER OUTPUT POWER IN ELECTRO-OPTICAL READERS

(75) Inventors: James Giebel, Centerport, NY (US); Matthew Blasczak, Coram, NY (US); Peter Fazekas, Bayport, NY (US); Mark Weitzner, Plainview, NY (US)

(73) Assignee: Symbol Technologies, Inc., Holtsville, NY (US)

(*) Notice: Subject to any disclaimer, the term of this patent is extended or adjusted under 35 U.S.C. 154(b) by 244 days.

(21) Appl. No.: 12/870,040

(22) Filed: Aug. 27, 2010

(65) Prior Publication Data

US 2012/0048942 A1     Mar. 1, 2012

(51) Int. Cl.
*G02B 26/10*     (2006.01)

(52) U.S. Cl.
USPC ............. 235/462.25; 235/462.06; 235/462.42

(58) Field of Classification Search
USPC ........... 235/462, 472, 462.06, 462.25, 462.42
See application file for complete search history.

(56) References Cited

U.S. PATENT DOCUMENTS

| | | |
|---|---|---|
| 4,613,895 A | 9/1986 | Burkey et al. |
| 4,794,239 A | 12/1988 | Allais |
| 5,304,786 A | 4/1994 | Pavlidis et al. |
| 5,703,349 A | 12/1997 | Meyerson et al. |
| 5,705,800 A * | 1/1998 | Dvorkis et al. .......... 235/462.08 |
| 7,609,736 B2 | 10/2009 | Difazio et al. |
| 2002/0104885 A1* | 8/2002 | Tanioka et al. .......... 235/462.33 |
| 2005/0092841 A1 | 5/2005 | Barkan |
| 2007/0057062 A1* | 3/2007 | Gurevich et al. ............. 235/455 |

* cited by examiner

*Primary Examiner* — Michael G Lee
*Assistant Examiner* — Tabitha Chedekel
(74) *Attorney, Agent, or Firm* — Nong-Qiang Fan

(57) ABSTRACT

In an electro-optical reader, an aiming or a scanning laser has a laser chip and a monitor photodiode. Output power of a laser beam emitted by the laser is regulated by a feedback circuit for maintaining substantially constant the laser beam output power during normal operation, a disabling circuit for disabling the feedback circuit, a drive circuit for driving the chip with a drive current when the feedback circuit is disabled, and for concomitantly generating a photodiode output voltage, a current modification circuit for modifying the drive current by a predetermined current with a concomitant change in the photodiode output voltage when the feedback circuit is disabled, and a control circuit for monitoring the change in the photodiode output voltage, for determining whether the change in the photodiode output voltage is sufficient to indicate an over-power condition, and for interrupting power to the chip when the over-power condition is indicated.

20 Claims, 4 Drawing Sheets

ARRANGEMENT FOR AND METHOD OF REGULATING LASER OUTPUT POWER IN ELECTRO-OPTICAL READERS

BACKGROUND OF THE INVENTION

Moving laser beam readers or laser scanners, as well as solid-state imaging systems or imaging readers, have been used to electro-optically read targets, such as one-dimensional bar code symbols, particularly of the Universal Product Code (UPC) type, each having a row of bars and spaces spaced apart along one direction; two-dimensional symbols, such as Code 49 that introduced the concept of vertically stacking a plurality of rows of bar and space patterns in a single symbol as described in U.S. Pat. No. 4,794,239, and PDF417 that increased the amount of data represented or stored on a given amount of surface area as described in U.S. Pat. No. 5,304,786; and non-symbol targets, such as documents, signatures and receipts.

Moving laser beam readers generally include a laser for emitting a laser beam, a focusing lens assembly for focusing the laser beam to form a beam spot having a certain size at a focal plane in a range of working distances, a scan component for repetitively scanning the beam spot across a target symbol in a scan pattern, for example, a scan line or a series of scan lines, across the symbol multiple times per second, e.g., forty times per second, a photodetector for detecting laser light reflected and/or scattered from the symbol and for converting the detected laser light into an analog electrical signal, and signal processing circuitry including a digitizer for digitizing the analog signal, and a microprocessor for decoding the digitized signal based upon a specific symbology used for the symbol.

The imaging reader includes a solid-state imager or sensor having an array of cells or photosensors that correspond to image elements or pixels in a field of view of the imager, an aiming light assembly having an aiming light source, e.g., an aiming laser, and an aiming lens for generating an aiming light pattern or mark on a target prior to reading, an illuminating light assembly for illuminating the field of view with illumination light from an illumination light source, e.g., one or more light emitting diodes (LEDs), and an imaging lens assembly for capturing return ambient and/or illumination light scattered and/or reflected from the target being imaged over a range of working distances and for projecting the captured light onto the array. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the target as, for example, disclosed in U.S. Pat. No. 5,703,349. It is also known to use the imager with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

As advantageous as both types of electro-optical readers are in reading symbols, it is always desirable to enhance performance. Increasing the intensity or brightness of the laser beam of the laser in the moving laser beam reader will increase the working distance range, because there will be correspondingly more return light to detect from symbols that are further away from the moving laser beam reader. Similarly, increasing the intensity or brightness of the aiming laser in the imaging reader will increase performance, because the aiming pattern will be more visible to an operator, especially for symbols that are further away from the imaging reader.

However, increasing the laser beam intensity too much for either the laser in the moving beam reader or the aiming laser in the imaging reader may violate human eye exposure laser safety standard limits. For example, a class 2 laser is limited to an output power of 1 mW over a base time interval of 250 msec, and a class 1 laser is limited to an output power of 0.39 mW over a base time interval of 10 sec. The laser beam intensity cannot exceed these limits not only in normal operation, but also in the event of reader malfunction or failure of laser power control circuitry specifically provided in each reader to insure that these limits are never surpassed.

The known laser power control circuitry in such readers monitors the laser current in order to provide feedback about the output power of the laser beam. Also, an internal light detector, e.g., a semiconductor monitor photodiode, is typically mounted inside the laser adjacent a semiconductor laser chip, for monitoring the output power of the laser beam. A microprocessor or programmed controller is operatively connected to the monitor photodiode, for controlling a monitored output power of the laser beam by deenergizing the laser when the monitored output power of the laser beam exceeds a safe power level limit.

For example, U.S. Pat. No. 7,609,736 discloses a laser power control arrangement, in which power to such a laser is interrupted upon detection of an over-power condition not conforming to preestablished regulatory standards. During an operational mode, a difference between laser drive currents at two operating points is compared to a difference between laser drive currents at the same two operating points during a calibration mode. A programmed controller sets the operating points by adjusting a digital potentiometer to different potentiometer settings. The over-power condition is recognized when the difference during the operational mode exceeds the difference during the calibration mode by a predetermined amount.

As advantageous as the known laser power control arrangement is in regulating laser output power, performance enhancements in processing speed and accuracy are desirable. For example, the processing software burden on the programmed controller is relatively significant, because the controller, together with an analog-to-digital converter, is tasked with frequently generating different commands to set the potentiometer to different potentiometer settings, measuring the laser drive currents at each setting, and determining and processing differences in such drive currents. In the case of a moving beam reader, these tasks are typically performed once per scan line. In the case of an imaging reader whose controller operates at about 60 frames per second, these tasks are typically performed once per frame, thereby imposing a significant software processing burden. Transitioning between the different potentiometer settings takes a non-negligible transition time, e.g., about 1.5 milliseconds, which some operators may find sluggish. Also, information signals indicative of such measurements are relatively small in magnitude, thereby reducing measurement accuracy. Lasers having higher slope efficiencies than those of currently available lasers could also reduce the magnitude of such information signals. In addition, each time that a low power potentiometer setting is established, the average laser output power and the perceived brightness of the laser light that dwells on the target are reduced for each scan line or frame, which may be objectionable to some operators.

Accordingly, there is a need for easing the software processing burden on the programmed controller, and enhancing the processing speed and increasing the measurement accuracy of such laser power control arrangements in such electro-optical readers.

SUMMARY OF THE INVENTION

The present invention generally relates to an electro-optical reader for reading targets, such as bar code symbols, which employs an energizable laser for emitting a laser beam. In the case of a moving laser beam reader, the laser is a scanning laser, and the laser beam is scanned across a target during reading. In the case of an imaging reader, the laser is an aiming laser, and the laser beam is directed in an aiming pattern at the target prior to reading.

One feature of this invention resides, briefly stated, in an arrangement for regulating output power of a laser beam emitted by such a laser that has an internal semiconductor laser chip and an internal semiconductor monitor photodiode. The arrangement includes a feedback circuit connected between the monitor photodiode and the laser chip, for maintaining substantially constant the output power of the laser beam during normal operation. The arrangement further includes a disabling circuit for periodically and momentarily disabling the feedback circuit. Preferably, the disabling circuit includes a switch in the feedback circuit. In the case of a moving laser beam reader, the disabling action is typically performed once per scan line. In the case of an imaging reader operative at multiple frames per second, the disabling action is typically performed once per frame. The disabling action can, however, be performed at different timing sequences, either synchronously or asynchronously with the scan lines or frames.

The arrangement further includes a drive circuit for driving the laser chip with a drive current when the feedback circuit is disabled, and for concomitantly generating an output voltage of the monitor photodiode. The drive circuit preferably includes a capacitor that is charged during the normal operation, and that drives the laser chip with the drive current when the feedback circuit is disabled. The arrangement still further includes a current modification circuit for periodically and momentarily modifying, e.g., reducing, the drive current by a predetermined current with a concomitant change in the output voltage of the monitor photodiode when the feedback circuit is disabled. The current modification circuit preferably includes a current source for generating the predetermined current, and a switch for switching the current source across the laser chip when the feedback circuit is disabled.

The arrangement yet further includes a control circuit for monitoring the change in the output voltage of the monitor photodiode, for determining whether the change in the output voltage is sufficient to indicate an over-power condition, and for interrupting power to the laser chip when the over-power condition is indicated. The control circuit preferably includes a comparator having a predetermined voltage threshold, and operative for changing states when the output voltage of the monitor photodiode crosses the predetermined voltage threshold, as well as a resettable timer connected to the comparator, for initiating a counting interval when the comparator changes states, for resetting the counting interval if the comparator does change states upon elapse of the counting interval, and for generating a laser-off signal if the comparator does not change states upon elapse of the counting interval. The control circuit also includes a power switch for interrupting power to the laser chip when the laser-off signal is generated. The control circuit also includes a microprocessor or programmed controller operative for switching all of the aforementioned switches, and assisting in temperature compensation.

Another feature of this invention resides in a method of regulating output power of a laser beam emitted by a laser that has an internal semiconductor laser chip and an internal semiconductor monitor photodiode, in an electro-optical reader for reading targets. The method is performed by maintaining substantially constant the output power of the laser beam during normal operation by connecting a feedback circuit between the monitor photodiode and the laser chip, periodically and momentarily disabling the feedback circuit, driving the laser chip with a drive current when the feedback circuit is disabled, and concomitantly generating an output voltage of the monitor photodiode, periodically and momentarily modifying the drive current by a predetermined current with a concomitant change in the output voltage of the monitor photodiode when the feedback circuit is disabled, and monitoring the change in the output voltage of the monitor photodiode, determining whether the change in the output voltage is sufficient to indicate an over-power condition, and interrupting power to the laser chip when the over-power condition is indicated.

The present invention enhances performance by increasing processing speed and accuracy. The above-described circuits are hardware-based, and therefore, the processing software burden on the programmed controller is eased, because the controller is no longer tasked with generating different commands to set a potentiometer to different potentiometer settings, waiting for and measuring the laser drive currents at each setting, and determining and processing differences in such drive currents. Also, the information signals indicative of such measurements are relatively greater in magnitude, thereby increasing measurement accuracy. Lasers having higher slope efficiencies than those of currently available lasers can now be used.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
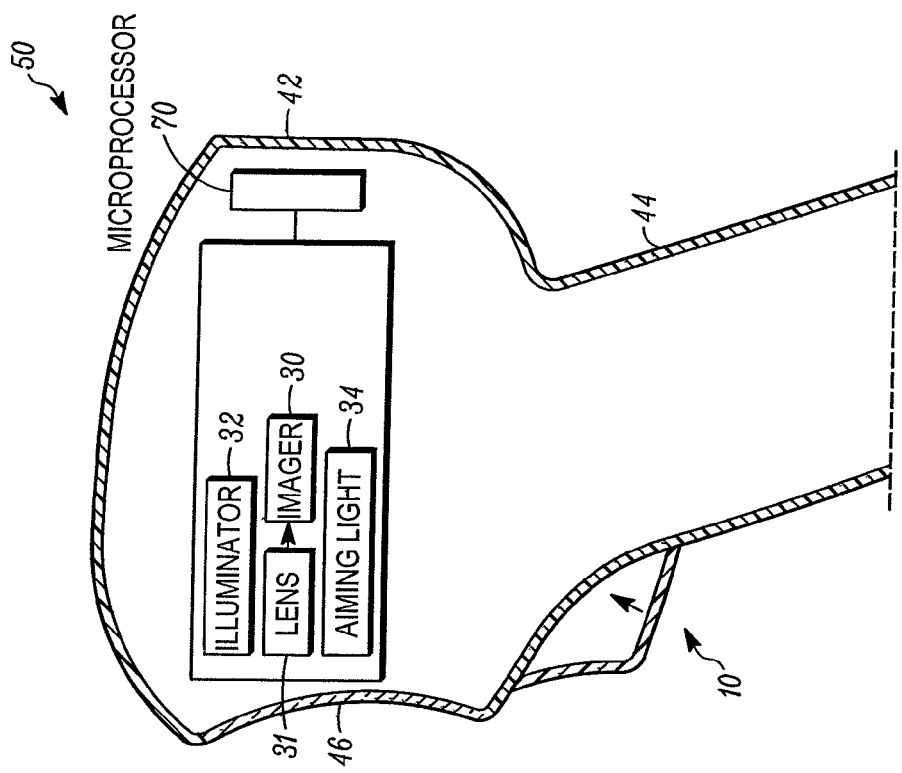
FIG. 1 is a schematic diagram of a handheld moving laser beam reader for electro-optically reading targets that can benefit from the present invention.

FIG. 1 depicts a moving laser beam reader 40 for electro-optically reading a target or indicia, such as a symbol, that may use, and benefit from, the present invention. The beam reader 40 includes a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or programmed controller 70 into data indicative of the symbol being read.

Figure 2:
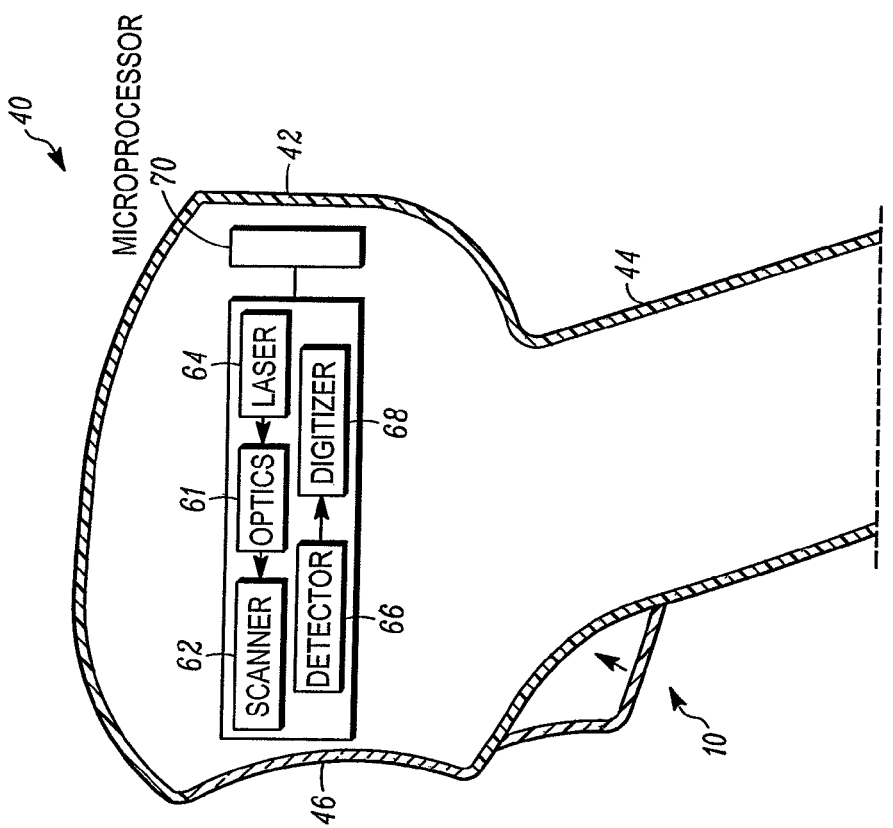
FIG. 2 is a schematic diagram of a handheld imaging reader for electro-optically reading targets that can benefit from the present invention.

FIG. 2 depicts an imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target through the window 46 during the imaging and for projecting the captured light onto the imager 30, to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator including an aiming laser 34 may also be provided for projecting an aiming light pattern or mark on the target prior to imaging.

In operation of the imaging reader 50, the controller 70 sends command signals to drive the aiming laser 34 to project the aiming pattern on the target prior to reading, and then to drive the illuminator LEDs 32 for a short time period, say 500 microseconds or less, and to energize the imager 30 during an exposure time period of a frame to collect light from the target during said time period. A typical array needs about 16-33 milliseconds to read the entire target image and operates at a frame rate of about 30-60 frames per second. The array may have on the order of one million addressable image sensors.

Figure 3:
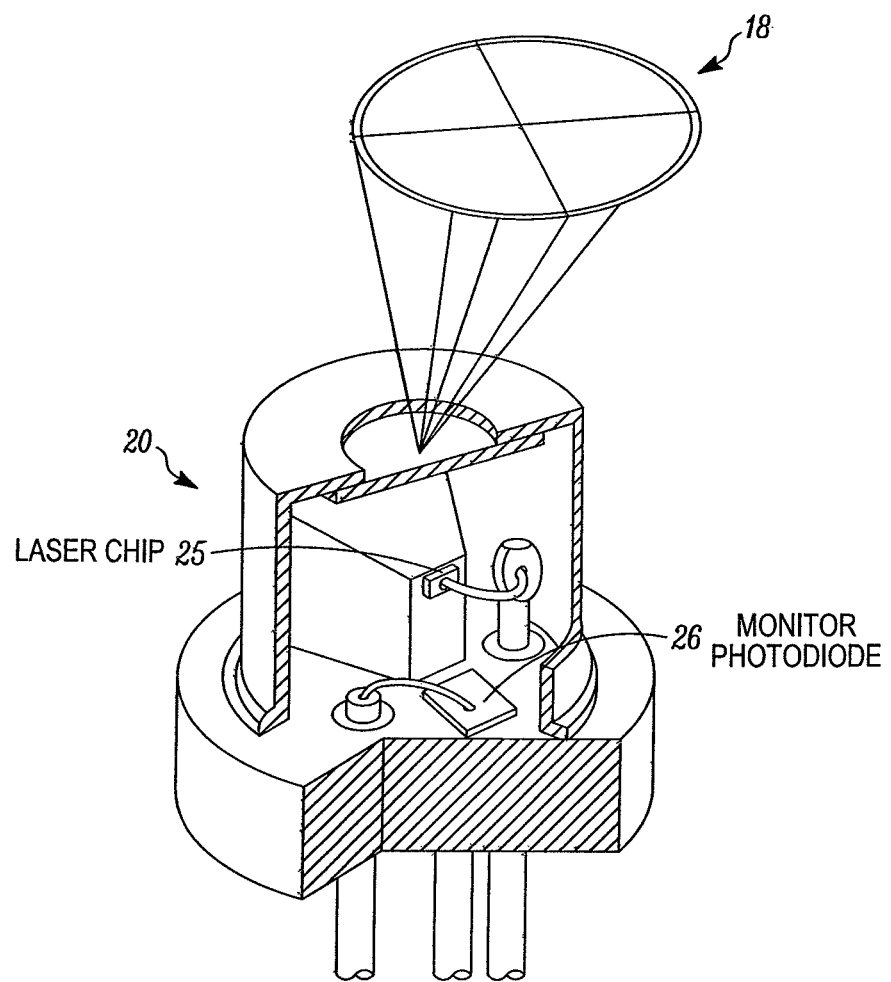
FIG. 3 is a broken-away, perspective view of a laser for use in the readers of FIG. 1 or 2 that can benefit from the present invention.

The laser 64, as shown in FIG. 1, or the aiming laser 34, as shown in FIG. 2, is depicted in isolation in FIG. 3 as a packaged semiconductor laser 20 that includes an internal laser diode (LD) or chip 25 for emitting a laser beam having an output power, and an internal monitor detector or photodiode (PD) 26 operative for monitoring the output power of the laser beam of the chip 25. FIG. 3 also shows that the emitted laser beam has an elongated, elliptical, or oval cross-section 18.

Figure 4:
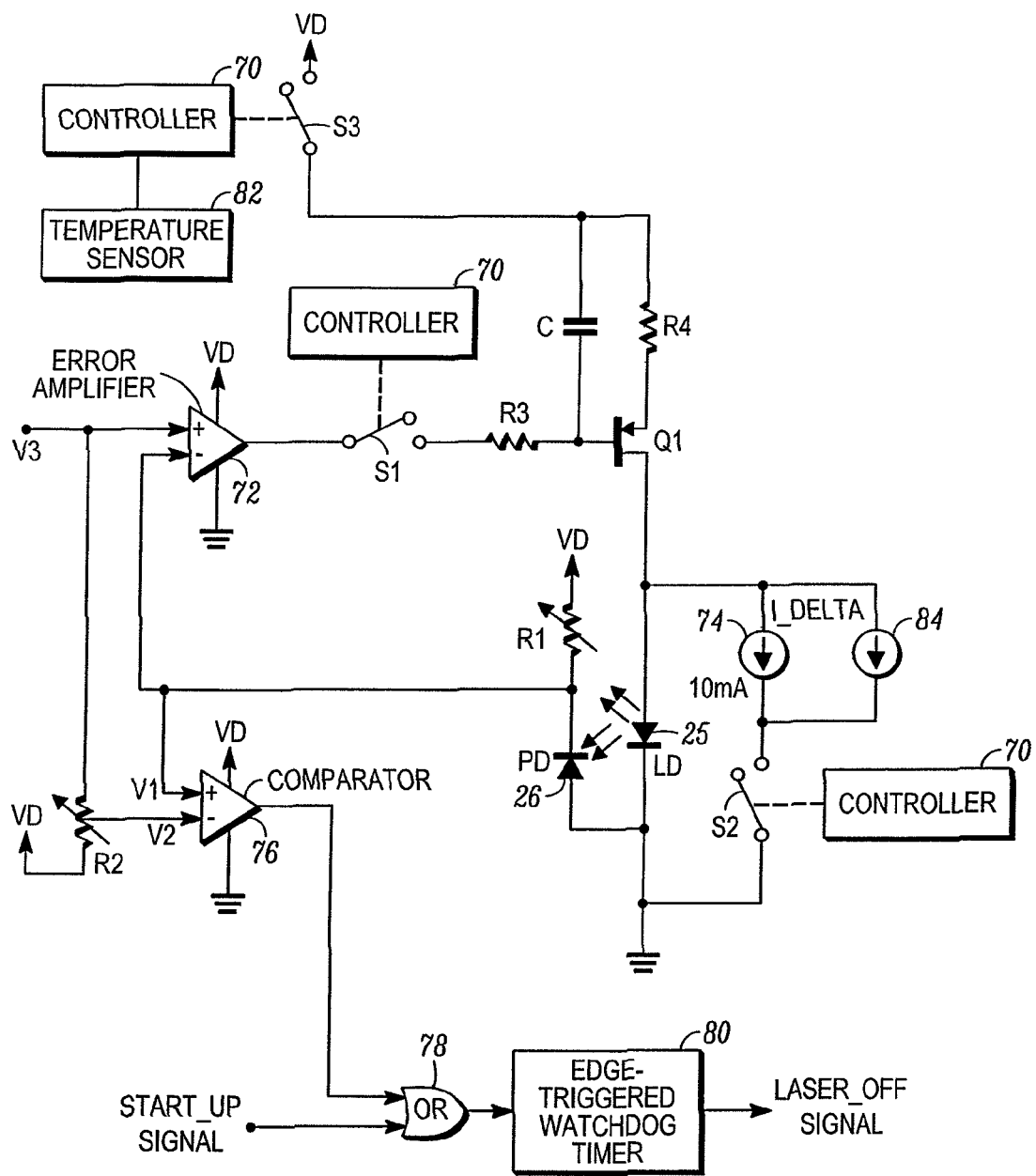
FIG. 4 is an electrical circuit schematic of an arrangement for and a method of controlling the laser of FIG. 3 in accordance with the present invention.

In accordance with this invention, as shown in FIG. 4, a hardware-based arrangement is operative for regulating output power of a laser beam emitted by such a laser 20 that has such an internal semiconductor laser chip 25 and such an internal semiconductor monitor photodiode 26. The arrangement includes a feedback circuit connected between the monitor photodiode 26 and the laser chip 25, for maintaining substantially constant the output power of the laser beam during normal operation. The feedback circuit includes an error amplifier 72 having its negative input terminal connected to a cathode of the photodiode 26, a resistor R3, and a field effect transistor Q1 that is connected to an anode of the laser chip 25. The positive input terminal of the error amplifier 72 is connected to a reference voltage V3. The transistor Q1 is biased by a supply voltage VD through a resistor R4. The cathode of the photodiode 26 is biased by the supply voltage VD through a resistor R1. During normal operation, the switches S1 and S3, whose operation is described in detail below, are closed, and the photodiode 26 detects the laser beam emitted by the chip 25 and generates an output voltage. If a drive current through the laser chip 25 increases due, for example, to a change in temperature, then the laser beam output power increases, and the photodiode output voltage also increases, in which case, the error amplifier 72 acts to modify the drive current through the laser chip 25 during normal operation, and vice versa.

The arrangement further includes a disabling circuit for periodically and momentarily disabling the feedback circuit. Preferably, the disabling circuit includes the aforementioned switch S1 in the feedback circuit and switchable by the controller 70. In the case of the moving laser beam reader 40, the disabling action is typically performed once per scan line. In the case of the imaging reader 50 operative at multiple frames per second, the disabling action is typically performed once per frame. The disabling action can, however, be performed at different timing sequences, either synchronously or asynchronously with the scan lines or frames.

The arrangement further includes a drive circuit for driving the laser chip 25 with a drive current when the feedback circuit is disabled, and for concomitantly generating an output voltage of the monitor photodiode 26. The drive circuit preferably includes a capacitor C that is charged during the normal operation, and that drives the laser chip 25 with the drive current when the feedback circuit is disabled. The capacitor C holds its charge and fixes a gate voltage on the transistor Q1, and this, in turn, fixes the drive current.

The arrangement still further includes a current modification circuit for periodically and momentarily modifying, e.g., reducing, the drive current through the laser chip 25 by a predetermined current (I_Delta) with a concomitant change in the output voltage of the monitor photodiode 26 when the feedback circuit is disabled. The current modification circuit preferably includes a constant current source 74 for generating the predetermined current (I_Delta), and a switch S2 for switching and shunting the current source 74, under the control of the controller 70, across the laser chip 25 when the feedback circuit is disabled.

As is well known, the laser 20 is characterized by a transfer function in which the raw output power of the emitted laser beam is plotted against the drive current flowing through the laser chip 25. In order for the laser chip 25 to emit light, the drive current that must be pumped through the laser chip 25 must at least correspond to a threshold current, commonly referred to as the "knee" of the transfer function. Once this threshold current is exceeded, additional drive current produces output powers that are directly, or nearly linearly proportional, to the drive current. The laser 20 of the instant invention is operated in this linear region of the transfer function. The slope of this linear region, also called the "slope efficiency", is assumed to be substantially constant, although it does slightly vary with variations in temperature or with aging. By way of non-limiting numerical example, the threshold current is about 30-40 milliamperes, and the drive current during normal operation is about 45-55 milliamperes, and the predetermined current (I_Delta) is about 10 milliamperes. Hence, when the predetermined current (I_Delta) is switched in to shunt the laser chip 25, the drive current does not go below the threshold current, and the laser chip 25 is still operating in the linear region of the transfer function.

The arrangement yet further includes a control circuit for monitoring the change in the output voltage of the monitor photodiode 26, for determining whether the change in the output voltage is sufficient to indicate an over-power condition, and for interrupting power to the laser chip 25 when the over-power condition is indicated. The control circuit preferably includes a comparator 76 having the output voltage V1 of the monitor photodiode 26 applied to its positive input terminal, and a predetermined reference voltage threshold V2 applied through a resistor R2 to its negative input terminal. The comparator 76 is operative for changing states when the output voltage V1 of the monitor photodiode 26 crosses the predetermined voltage threshold V2.

Figure 5:
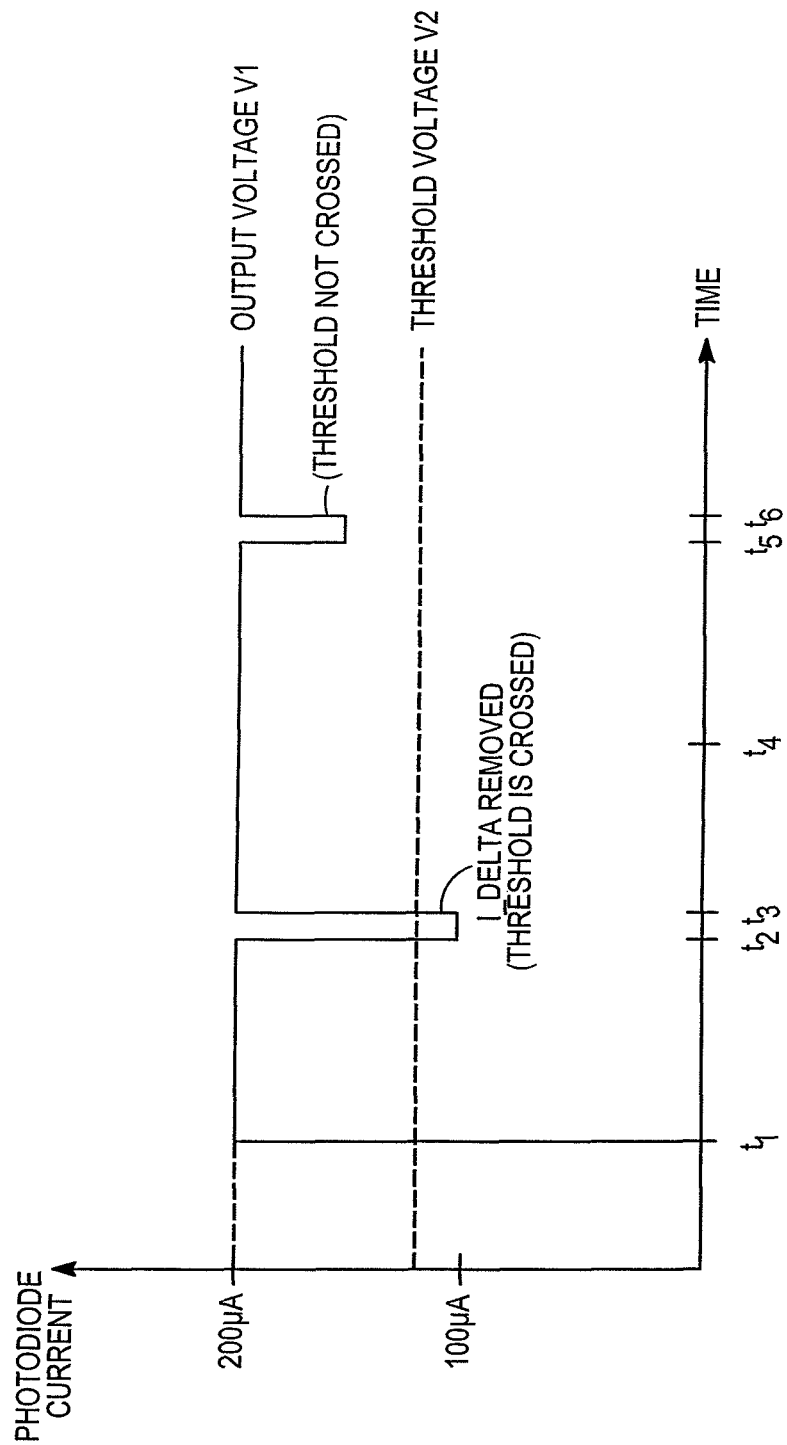
FIG. 5 is a graph of monitor photodiode electrical current versus time to help explain the electrical circuit schematic of FIG. 4 in accordance with the present invention.

FIG. 5 is a graph depicting the current through the monitor photodiode 26 as a function of time. The photodiode current corresponding to the output voltage V1 of the monitor photodiode 26 is shown in relation to the photodiode current corresponding to the predetermined voltage threshold V2. The output voltage V1 of the monitor photodiode 26 crosses the predetermined voltage threshold V2 during the time interval t2 to t3, but does not cross the predetermined voltage threshold V2 during the time interval t5 to t6.

The comparator 76 has an output terminal connected to one input of an OR gate 78, whose other input receives a start-up signal. The OR gate 78 has its output connected to a resettable, edge-triggered, watchdog timer 80, for initiating a counting interval when the comparator 76 changes states, for resetting the counting interval if the comparator 76 does change states upon elapse of the counting interval, and for generating a Laser_Off signal if the comparator 76 does not change states upon elapse of the counting interval. The control circuit also includes the aforementioned power switch S3 for interrupting power to the laser chip 25 when the Laser_Off signal is generated. The microprocessor or programmed controller 70 is operative for switching all of the aforementioned switches S1, S2, S3.

As shown in FIG. 5, the timer 80 initiates the counting interval at a leading edge of the change of state of the comparator 76, i.e., at t2, for fast processing. The counting interval lasts from t2 to at least t5. If the timer 80 finishes counting without crossing the threshold V2 at t5, as indicated in FIG. 5, then the Laser_Off signal is generated, and the power to the laser chip 25 is interrupted.

Hence, in accordance with this invention, a known current (I_Delta) of about 10 milliamperes is subtracted from the laser chip's normal operating drive current while the feedback circuit is open-circuited by switch S1. This action prevents the feedback circuit from influencing the laser chip drive current while the control circuit quickly measures the output voltage produced by the monitor photodiode 26. Removing 10 milliamperes from the laser chip drive current will typically reduce the raw laser output power by about 5 milliwatts, thereby producing a very predictable change in the photodiode output voltage V1. If this photodiode output voltage V1 fails to cross the calibrated threshold voltage V2, when the drive current in the laser chip 25 is reduced, then the comparator 76 will not change states and transition, and this, in turn, will cause the timer 80 to expire, and the Laser_Off signal will remove the power to the laser chip 25.

The arrangement of this invention detects a change in gain of the laser 20, in a manner similar to that of a photodiode 26 with a slowly deteriorating responsivity. In an imaging reader, the arrangement needs to periodically and momentarily transition from the normal operating mode to this reduced current mode to prevent the laser drive's controls from timing out and turning off the laser 20. This momentary transition should be very fast, on the order of tens of microseconds to complete the measurement, and the measurement could be made once a frame, or many times per frame, and could even, if desired, be asynchronous. In addition, another timer could be used to generate any needed timing sequence without help from the controller 70, or a state machine could be used to generate all required signals each time the laser 20 is enabled.

As shown in FIG. 5, I_Delta is applied in the interval between t2 and t3, and this causes the laser output power to drop by about 50%, thereby crossing the voltage threshold V2 set by the resistor R2, and causing the comparator 76 to transition. Later in time, at t5, the same I_Delta is applied after the feedback circuit loses gain (about 50%). At this time, the feedback circuit has doubled the laser output power in the process of compensating for this loss, but the magnitude of the change in the photodiode current has been reduced by about 50% as well, and the event is detected, and the threshold V2 is not crossed, thereby allowing the timer 80 to time out.

The arrangement of this invention can be further enhanced by compensating for the effects of changes to the slope efficiency of the laser 20 as a function of temperature. As described above, the slope efficiency of the laser 20 is characterized by a linear change in optical output power for a given change in laser drive current, above the threshold or knee of the transfer function. For example, a typical slope efficiency for a laser at room temperature would be about 0.5 milliwatt/milliampere, where an extra 2 milliamperes of drive current would result in an additional 1 milliwatt of optical output power. Also, for this example, a typical temperature coefficient for a laser's slope efficiency is −0.00193 milliwatt/milliampere/degree Centigrade, such that a laser with a room temperature slope efficiency of 0.5 milliwatt/milliampere would have a slope efficiency of 0.413 milliwatt/milliampere at 70 degrees Centigrade.

The effect of the slope efficiency change with temperature is to lessen the change in voltage at the positive input terminal of the comparator 76 when switch S2 is closed, thereby bringing the response voltage closer to the threshold that is determined by resistor R2 and comparator 76. Without temperature compensation, an additional margin has to be built into the calibration setting of the resistor R2 to ensure that the effects of temperature on the slope efficiency does not cause the laser 20 to turn off prematurely at elevated operating temperatures. This has the effect that more of a margin has to be built in between the normal operating level of the laser 20, and the accessible emission limit, as defined by the EN60825-1 standard.

There are various methods of compensating for the effects of temperature on a laser's slope efficiency. One embodiment is to apply a correction to the R2 setting in software. The controller 70 could sense the temperature, either from an on-chip or an off-chip temperature sensor 82, and either by accessing a look-up table or by calculation using a numerical formula, the controller 70 can apply a correction to the threshold defined by resistor R2 and comparator 76. Since the temperature coefficient can be different from one laser to the next, the software correction to the R2 setting can be tuned in software for the specifications of the laser actually used.

A second embodiment is to have another current source 84 in parallel with the current source 74. This additional current source 84 would need to add current to the fixed 10 milliamperes current source 74, to compensate for the diminished slope efficiency of the laser 20 at higher temperatures. For example, assume a slope efficiency of 0.5 milliwatt/milliampere at 25 degrees Centigrade, and a slope efficiency of 0.413 milliwatt/milliampere at 70 degrees Centigrade. When running at room temperature, the arrangement of this invention would lower the laser output power by 5 milliwatts when the switch S2 is closed. To lower the laser output power by 5 milliwatts at 70 degrees Centigrade, the current source 74 would need to supply 12.1 milliamperes, rather than 10 milliamperes. The additional current source 84 in parallel with the fixed 10 mA current source 74 would accomplish this and supply the extra current, if the parallel current source 84 was designed to match the temperature coefficient of the laser's slope efficiency. As with the first embodiment, the temperature coefficient of the slope efficiency may change from one laser to the next, such that a programmable gain to this additional current source's temperature coefficient could accommodate multiple lasers.

It will be understood that each of the elements described above, or two or more together, also may find a useful application in other types of constructions differing from the types described above.

While the invention has been illustrated and described as embodied in laser power control arrangements and methods in electro-optical readers, it is not intended to be limited to the details shown, since various modifications and structural changes may be made without departing in any way from the spirit of the present invention. Although described in connection with readers, the laser control arrangements of this invention can equally well be applied to laser projection displays and, in general, any system in which a laser is used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for regulating output power of a laser beam emitted by a laser that has an internal semiconductor laser diode and an internal semiconductor monitor photodiode, in an electro-optical reader for reading targets, comprising:
   a feedback circuit configure to receive electrical signal from the monitor photodiode and to adjust the output power in response to the electrical signal received from the monitor photodiode, for maintaining substantially constant the output power of the laser beam during normal operation;
   a disabling circuit for periodically and momentarily disabling the feedback circuit;
   a drive circuit for driving the laser diode with a drive current when the feedback circuit is disabled, and for concomitantly generating an output voltage of the monitor photodiode;
   a current modification circuit for periodically and momentarily modifying the drive current passing through the laser diode by a predetermined current with a concomitant change in the output voltage of the monitor photodiode when the feedback circuit is disabled; and
   a control circuit for monitoring the change in the output voltage of the monitor photodiode, for determining whether the change in the output voltage of the monitor photodiode is sufficient to indicate an over-power condition, and for interrupting power to the laser diode when the over-power condition is indicated.

2. The arrangement of claim 1, wherein the disabling circuit includes a switch in the feedback circuit and switchable by the control circuit.

3. The arrangement of claim 1, wherein the drive circuit includes a capacitor that is charged during normal operation, and that drives the laser diode with the drive current when the feedback circuit is disabled.

4. The arrangement of claim 1, wherein the current modification circuit includes a current source for generating the predetermined current, and a switch switchable by the control circuit for switching the current source across the laser diode when the feedback circuit is disabled.

5. The arrangement of claim 1, wherein the control circuit includes a comparator having a predetermined voltage threshold, and operative for changing states when the output voltage of the monitor photodiode crosses the predetermined voltage threshold.

6. The arrangement of claim 5, wherein the control circuit includes a resettable timer connected to the comparator, for initiating a counting interval when the comparator changes states, for resetting the counting interval if the comparator does change states upon elapse of the counting interval, and for generating a laser-off signal if the comparator does not change states upon elapse of the counting interval.

7. The arrangement of claim 6, wherein the control circuit includes a power switch switchable by the control circuit when the laser-off signal is generated to interrupt power to the laser diode.

8. The arrangement of claim 1, and a temperature sensor operatively connected with the control circuit for compensating for temperature variations.

9. The arrangement of claim 1, wherein the laser is a scanning laser in which the laser beam is moved by the reader across the target during reading.

10. The arrangement of claim 1, wherein the laser is an aiming laser in which the laser beam is directed in an aiming pattern at the target prior to reading.

11. A method of regulating output power of a laser beam emitted by a laser that has an internal semiconductor laser diode and an internal semiconductor monitor photodiode, in an electro-optical reader for reading targets, comprising the steps of:
   maintaining substantially constant the output power of the laser beam during normal operation by connecting a feedback circuit configure to receive electrical signal from the monitor photodiode and to adjust the output power in response to the electrical signal received from the monitor photodiode;
   periodically and momentarily disabling the feedback circuit;
   driving the laser diode with a drive current when the feedback circuit is disabled, and concomitantly generating an output voltage of the monitor photodiode;
   periodically and momentarily modifying the drive current passing through the laser diode by a predetermined current with a concomitant change in the output voltage of the monitor photodiode when the feedback circuit is disabled; and
   monitoring the change in the output voltage of the monitor photodiode, determining whether the change in the output voltage is sufficient to indicate an over-power condition, and interrupting power to the laser diode when the over-power condition is indicated.

12. The method of claim 11, wherein the step of disabling the feedback circuit is performed by switching a switch in the feedback circuit.

13. The method of claim 11, wherein the step of driving the laser diode is performed by charging a capacitor during normal operation, and driving the laser diode with the drive current regulated by the capacitor when the feedback circuit is disabled.

14. The method of claim 11, wherein the step of modifying the drive current is performed by generating the predetermined current with a current source, and switching the current source across the laser diode when the feedback circuit is disabled.

15. The method of claim 11, wherein the monitoring step is performed by changing states of a comparator when the output voltage of the monitor photodiode crosses a predetermined voltage threshold of the comparator.

16. The method of claim 15, wherein the determining step is performed by initiating a counting interval when the comparator changes states, resetting the counting interval if the comparator does change states upon elapse of the counting interval, and generating a laser-off signal if the comparator does not change states upon elapse of the counting interval.

17. The method of claim 16, wherein the interrupting step is performed by switching a power switch when the laser-off signal is generated to interrupt power to the laser diode.

18. The method of claim 11, and compensating for temperature variations.

19. The method of claim 11, and scanning the laser beam across the indicia during reading.

20. The method of claim 11, and aiming the laser beam in an aiming pattern at the indicia prior to reading.

* * * * *